W. T. HAYNES.
MILK TURNER.
APPLICATION FILED SEPT. 1, 1911.
1,023,737.
Patented Apr. 16, 1912.
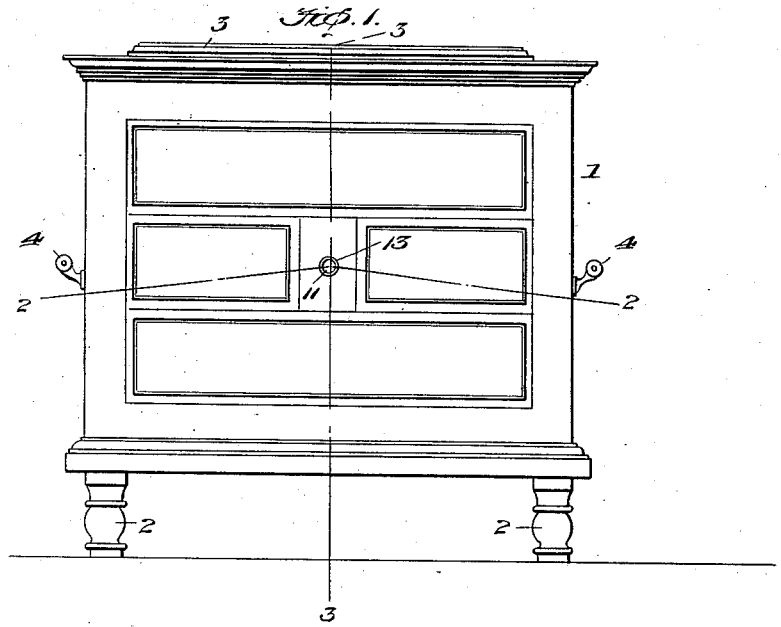
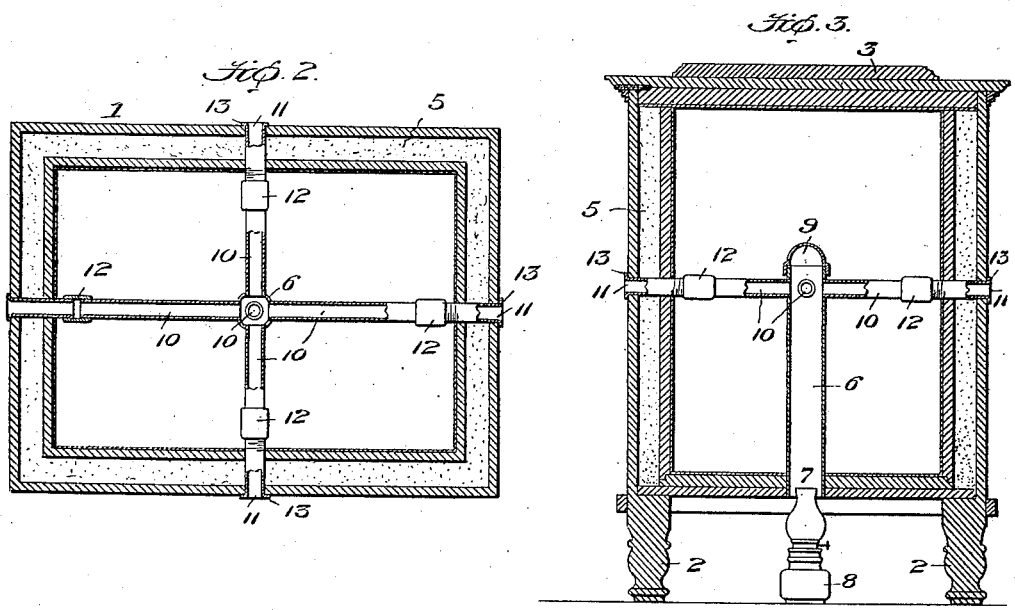

UNITED STATES PATENT OFFICE.

WILLAM THOMAS HAYNES, OF EAST ATLANTA, GEORGIA.

MILK-TURNER.

1,023,737. Specification of Letters Patent. Patented Apr. 16, 1912.

Application filed September 1, 1911. Serial No. 647,283.

*To all whom it may concern:*

Be it known that I, WILLAM T. HAYNES, a citizen of the United States, residing at East Atlanta, county of Dekalb, and State of Georgia, have invented certain new and useful Improvements in Milk-Turners, of which the following is a specification.

This invention relates to milk turners.

My object is the provision of a simple, inexpensive and durable device of novel construction whereby milk may be turned or brought to a suitable temperature by the application of heat, particularly in winter, so that it will be adapted, when churned, to produce the highest yield of butter and which may be so arranged that it can be used for cooling milk in summer.

The invention embodies a suitable box or casing and a novel arrangement of heating pipes associated therewith and adapted to receive a current of hot air from a lamp or other heating device, as will more fully appear hereinafter.

In the accompanying drawings:—Figure 1 is a front elevation, showing one of the outlets of the heating pipe or tube system; Fig. 2, a horizontal section on line 2—2, Fig. 1; and Fig. 3, a vertical section on line 3—3, Fig. 1.

The box or case 1 may be of any preferred construction and suitably supported by legs 2, provided with a suitable hinged top or cover 3 and preferably provided with handles 4 by which it may be readily moved about. Preferably, the box is double walled and provided with an interior heat insulating packing or filling 5.

My invention embodies a system of heating pipes of which one 6 is preferably disposed centrally and interiorly of the box and secured to and opening through the bottom thereof at 7 to permit the admission of heat derived from any suitable source, such as a lamp 8 placed on the floor. The upper end of the pipe 6 is provided with a removable cap 9 which permits access thereto for purposes of cleaning, but which normally closes the end of the said upright pipe.

Extending outwardly from and connected to the upper end of the pipe 6 in any preferred manner, as by screw joints, are the branch pipes 10, of which there may be as many as desired, which extend through the walls of the box 1 and are opened to the external air at 11. Preferably, where a rectangular box 1 is used, there will be a sufficient number of the pipes 10 so that there may be one branch and outlet 11 for each side thereof. The pipes 10 are made in sections connected by suitable screw couplings 12 and the outer ends of the pipes are provided with heads 13, whereby the entire structure may be secured in position in the box 1 and yet be capable of being taken down and removed at any time.

The heating agency 8 causes the heat to pass upwardly into the pipe 6 and to be distributed through the pipes 10, thus warming the interior of the box 1 evenly, especially as the pipes 10 are disposed, preferably, intermediate the top and bottom of the box. The natural draft causes the heat and products of combustion (if a lamp is used as the heating agency) to pass out to the atmosphere after heating the interior of the box. The milk to be warmed or turned is inserted in the box in any suitable receptacles, the lid closed, and the heat applied, resulting in bringing the milk to the desired temperature and maintaining such temperature as will be best adapted to produce the highest yield of butter when the milk is subsequently churned.

When any cleaning of the soot is necessary, the pipe system can be removed and thoroughly cleansed. Such cleansing of the pipe 6 can be readily obtained, without taking down the pipe system, by removing the cap 9.

The device is as well adapted for use as a refrigerator or cooling box for milk in summer as for bringing milk to the desired temperature in winter.

Having thus described my invention, what I claim as new and desire to secure by Letters Patent, is:—

In a milk turner, the combination with a box or casing, of an upright pipe within said box which opens through the bottom thereof and is provided with a removable cap on its upper end located within the box, lateral pipes detachably connected to said upright pipe within the box and extending through the walls of the box and opening to the exterior thereof, said lateral pipes being made in detachable sections, and couplings connecting said detachable pipe sections within the box.

In testimony whereof, I hereunto affix my signature in presence of two witnesses.

WILLAM THOMAS HAYNES.

Witnesses:
L. L. MARBERT,
G. B. MINOR.

Copies of this patent may be obtained for five cents each, by addressing the "Commissioner of Patents, Washington, D. C."